(12) United States Patent
Chen

(10) Patent No.: US 11,993,937 B2
(45) Date of Patent: May 28, 2024

(54) ADHESIVE FLOOR/WALLBOARD AND METHOD OF USING SAME

(71) Applicant: Wellmade Floor Covering International, Inc., Wilsonville, OR (US)

(72) Inventor: Zhu Chen, Nanjing (CN)

(73) Assignee: WELLMADE FLOOR COVERING INTERNATIONAL, INC., Wilsonville, OR (US)

( * ) Notice: Subject to any disclaimer, the term of this patent is extended or adjusted under 35 U.S.C. 154(b) by 15 days.

(21) Appl. No.: 17/000,860

(22) Filed: Aug. 24, 2020

(65) Prior Publication Data
US 2022/0056704 A1 Feb. 24, 2022

(51) Int. Cl.
| | |
|---|---|
| E04B 1/38 | (2006.01) |
| B32B 3/26 | (2006.01) |
| B32B 5/18 | (2006.01) |
| B32B 7/06 | (2019.01) |
| B32B 7/12 | (2006.01) |
| E04F 13/08 | (2006.01) |
| E04F 15/02 | (2006.01) |
| E04F 15/10 | (2006.01) |

(52) U.S. Cl.
CPC .......... *E04F 13/0887* (2013.01); *B32B 3/266* (2013.01); *B32B 5/18* (2013.01); *B32B 7/06* (2013.01); *B32B 7/12* (2013.01); *E04F 13/0866* (2013.01); *E04F 15/02155* (2013.01); *E04F 15/107* (2013.01); *B32B 2471/00* (2013.01); *B32B 2607/00* (2013.01)

(58) Field of Classification Search
CPC ... E04F 13/0885; E04F 13/0887; B32B 3/266
See application file for complete search history.

(56) References Cited

U.S. PATENT DOCUMENTS

| | | | | |
|---|---|---|---|---|
| 4,172,168 A | * | 10/1979 | Klaffke | E01C 13/045 428/95 |
| 5,255,482 A | * | 10/1993 | Whitacre | E04F 15/186 52/390 |
| 6,033,756 A | * | 3/2000 | Handscomb | G10K 11/172 181/295 |
| 6,254,711 B1 | * | 7/2001 | Bull | B44C 1/1716 156/247 |
| 6,343,451 B1 | * | 2/2002 | Chih | E04F 13/0885 52/312 |

(Continued)

FOREIGN PATENT DOCUMENTS

CN 210415715 U 4/2020

*Primary Examiner* — Basil S Katcheves
(74) *Attorney, Agent, or Firm* — Venable LLP

(57) ABSTRACT

An adhesive floor/wallboard includes a floor/wallboard main body layer and a buffer layer adhered to the back surface of the floor/wallboard main body layer. The buffer layer is provided with a plurality of holes. The holes extend through the buffer layer to the main body layer. Glue is deposited in the holes. The buffer layer is adhered to the back surface of the floor/wallboard. The glue in the holes makes direct contact with the floor/wallboard main body at the holes. Due to the holes and their depth, the contact area between the glue, the buffer layer and the main body is increased. Accordingly, the adhesive floor/wallboard can be more firmly adhered to a backing surface.

13 Claims, 3 Drawing Sheets

(56) References Cited

U.S. PATENT DOCUMENTS

| | | | | |
|---|---|---|---|---|
| 6,789,646 | B2* | 9/2004 | Wang | G10K 11/168 |
| | | | | 181/294 |
| 7,018,501 | B1* | 3/2006 | Nelson | G09F 21/04 |
| | | | | 156/278 |
| 7,799,157 | B2* | 9/2010 | Kato | C09J 7/403 |
| | | | | 156/87 |
| 8,343,611 | B2* | 1/2013 | Tobita | B32B 17/10247 |
| | | | | 428/137 |
| 10,753,100 | B2* | 8/2020 | Kim | B32B 7/12 |
| 2007/0218269 | A1* | 9/2007 | Kato | C09J 7/38 |
| | | | | 427/208.4 |
| 2010/0313455 | A1* | 12/2010 | Kim | B32B 27/36 |
| | | | | 40/594 |
| 2012/0183715 | A1* | 7/2012 | Calkins | A61B 6/04 |
| | | | | 428/317.1 |
| 2014/0017486 | A1* | 1/2014 | Yoo | B32B 38/0004 |
| | | | | 427/289 |
| 2014/0227484 | A1* | 8/2014 | Sung | E04F 15/107 |
| | | | | 428/141 |
| 2016/0032597 | A1* | 2/2016 | Keane | E04F 15/10 |
| | | | | 52/741.1 |
| 2019/0048593 | A1* | 2/2019 | Kim | B32B 5/02 |

* cited by examiner

ADHESIVE FLOOR/WALLBOARD AND METHOD OF USING SAME

TECHNICAL FIELD

The disclosure relates to a floor/wallboard, and in particular, to a floor/wallboard that is adhered and mounted to a backing surface, which may be a floor or wall.

RELATED ART

The relatively thin floors or wallboards with a thickness of 0.5-5 mm are widely applied to places such as shopping malls and office places due to low costs. The floors or wallboards of such a thickness cannot be provided with lock catches on the sides or edges, so the floors or wallboards are usually pressed into place and secured with an adhesive. The floors and wallboards may have a problem of poor sound insulation and poor adherence. The solution described herein is to apply a relatively soft buffer material, such as cork wood, foamed EVA, or IXPE, to the back surface of the floor or wallboard to form a buffer layer. During mounting, the buffer layer is adhered to a backing surface by glue. Holes in the buffer layer allow the glue to form a bond with a main body of the floor or wallboard, the buffer layer, and the backing surface. As a result, the floor or wallboard may be adhered firmly to the backing surface.

SUMMARY

An object of the disclosure is to provide an adhesive floor/wallboard, which can be more firmly adhered to a backing or base surface. As described below, the exemplary adhesive floor/wallboard structurally includes a floor/wallboard main body layer, and further includes a buffer layer adhered to the back surface of the floor/wallboard main body layer. The buffer layer is provided with a plurality of holes. The holes have a depth that extends through the buffer layer so the holes extend to and communicate with the main body layer.

The holes may be round holes, elliptical holes, square holes or irregular holes, and the area of the holes may be 25% to 75% of the area of the buffer layer. The holes may be made in the form of patterns, logos, and characters to improve the identification of the adhesive floor/wallboard.

Preferably, the material of the buffer layer is foamed PVC, cork wood, foamed EVA, or IXPE (crosslinked polyethylene foaming material).

The adhesive floor/wallboard may also include a self-adhesive layer and a release layer, where the self-adhesive layer is adhered to the back surface of the buffer layer, the release layer is adhered to the back surface of the self-adhesive layer, and the self-adhesive layer and the release layer are also provided with holes in the positions corresponding to the holes of the buffer layer.

Preferably, the thickness of the floor/wallboard main body layer is 0.5-5 mm and the thickness of the buffer layer is 0.5-5 mm.

Preferably, the material of the floor/wallboard main body layer is a wood board, a bamboo board, a high density PVC composite material, a glass magnesium plate, a high density fiberboard, a medium density fiberboard, an aluminum alloy material, a cement board, an aluminum-plastic board, textile, a paperboard or an HPL fireproof board (thermosetting resin impregnated paper high pressure laminate board).

In another aspect of the disclosure, the buffer layer is pasted to the back surface of the thin floor/wallboard, and a plurality of holes is formed on the buffer layer.

During mounting of the adhesive floor/wallboard to a backing surface, the glue is applied to the buffer layer or the release paper, depending upon the embodiment of the adhesive floor/wallboard. The glue can make direct contact with the main body of the floor/wallboard through the holes. Due to the holes, the contact area between the glue and the buffer layer can be increased, so that the adhesive floor/wallboard and the backing surface to which the adhesive floor/wallboard is adhered may be more firmly adhered. The buffer layer can play roles of balancing, buffering, and silencing for the floor, and can play roles of balancing, buffering, and sound insulation for the wallboard.

The self-adhesive layer and the release layer may be disposed on the back surface of the buffer layer, and the holes of the self-adhesive layer and release layer may be provided in the positions corresponding to the holes of the buffer layer. Due to the self-adhesive layer, the adhesive floor/wallboard may be fixed on the backing surface to prevent displacement when the glue is not dried yet. Especially when used as a wallboard and when the glue is not cured yet, the adhesive floor/wallboard may be prone to slip off of the wall if the self-adhesive layer is not used for fixing the position in advance. According to the disclosure, the wallboard is fixed with the self-adhesives, and then as the glue cures, the floor/wallboard is firmly adhered in place to the backing surface.

BRIEF DESCRIPTION OF THE DRAWINGS

The disclosure will be further described below with reference to the accompanying drawings and embodiments.

DETAILED DESCRIPTION

Embodiment 1

Figure 1:
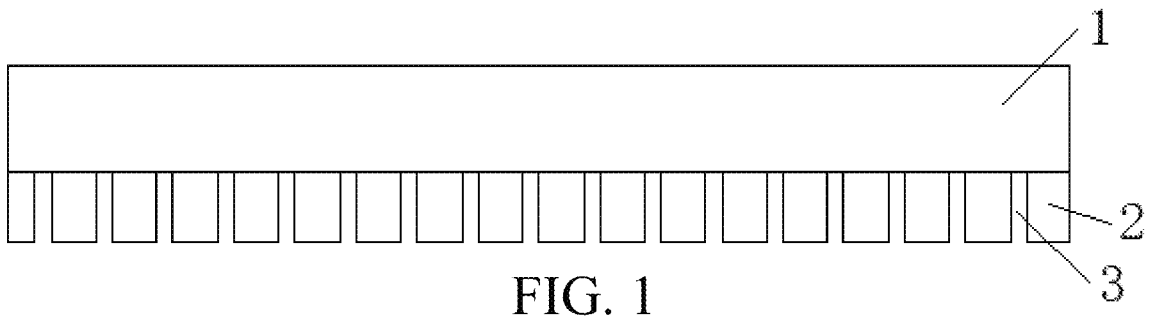
FIG. 1 is a cross-sectional view of an adhesive floor/wallboard according to Embodiment 1.
Figure 2:
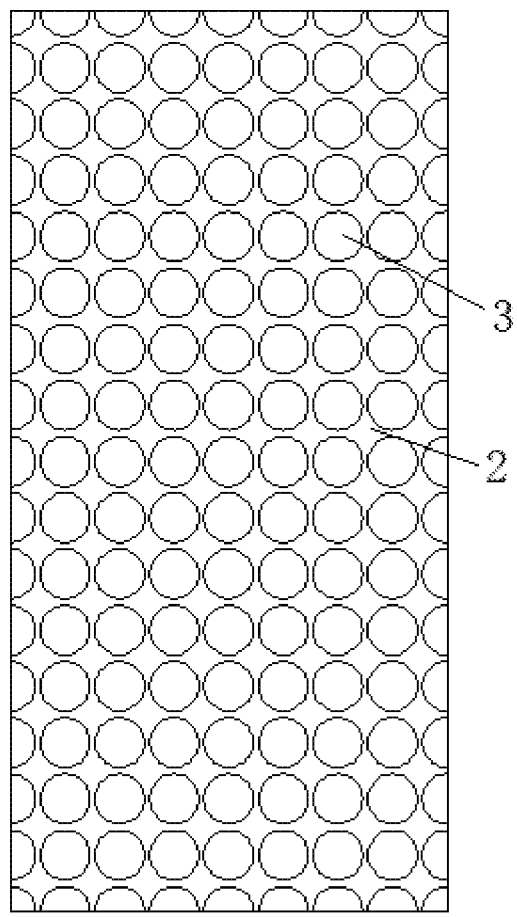
FIG. 2 is a schematic structural diagram of a back surface of an adhesive floor/wallboard according to Embodiment 1.

As shown in FIG. 1 and FIG. 2, the adhesive floor/wallboard structurally includes a floor/wallboard main body layer 1 and further includes a buffer layer 2 adhered to the back surface of the floor/wallboard main body layer. The buffer layer is provided with a plurality of holes 3. The holes at the back surface of the floor/wallboard main body layer 1 extend through and communicate with the outside edges of the adhesive floor/wallboard. The holes 3 extend through the buffer layer 2 and extend to and communicate with the main body layer 1. The thickness of the floor/wallboard main body layer is 0.5 mm, the thickness of the buffer layer is 0.5 mm, the diameter of the holes is 1 mm, the holes are round holes, the area of the holes is 50% of the area of the buffer layer, and the material of the buffer layer is foamed PVC. The material of the floor/wallboard main body layer is a cement board.

During preparation, foamed PVC is adhered to the back surface of the floor/wallboard main body layer, the buffer layer formed by the foamed PVC is punched and the depth of the holes is controlled to avoid damage to the floor/wallboard main body layer. Alternatively, the buffer layer may be foamed PVC, punched in advance, and then adhered to the back surface of the floor/wallboard main body layer. Or the hole structures are formed on the buffer layer formed by the foamed PVC through punching, etching, molding, casting or any other manner.

During use, after the backing surface on the floor or the wall is cleaned, glue is applied to the buffer layer. The amount of glue applied is sufficient to enter the holes such that when the adhesive floor/wallboard is pressed into place onto the backing surface, the glue enters the holes and contacts the main body of the adhesive floor/wallboard. Then, pressure is applied to the floor/wallboard to cause the glue to enter the holes, and the installation work is completed after the glue is cured.

Embodiment 2

Figure 3:
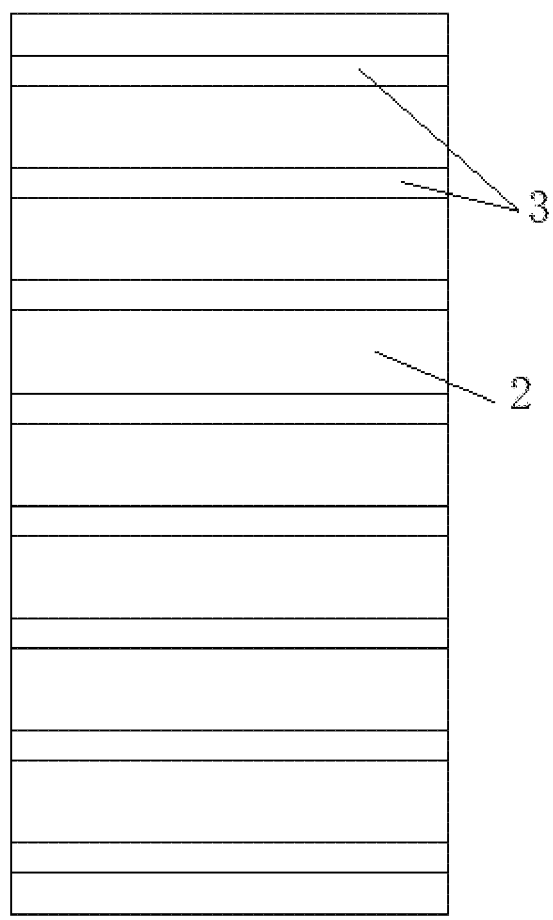
FIG. 3 is a schematic structural diagram of a back surface of an adhesive floor/wallboard according to Embodiment 2.

As shown in FIG. 3, the adhesive floor/wallboard structurally includes a floor/wallboard main body layer 1 and further includes a buffer layer 2 adhered to the back surface of the floor/wallboard main body layer. The buffer layer is provided with a plurality of holes 3. The holes have a depth that extends through the buffer layer so the holes communicates with the main body layer. The thickness of the floor/wallboard main body layer is 2 mm, the thickness of the buffer layer is 1 mm, the holes are rectangular shaped holes, the area of the holes is 35% of the area of the buffer layer, and the material of the buffer layer is cork wood. The material of the floor/wallboard main body layer is an aluminum alloy material.

During preparation of the buffer layer of adhesive floor/wallboard, cork wood is adhered to the back surface of the floor/wallboard main body layer, and then is cut to form rectangular holes, avoiding damage to the floor/wallboard main body layer during cutting. Alternatively, during preparation of the buffer layer of adhesive floor/wallboard, cork wood is cut into bars in advance, and then the bars adhered to the back surface of the floor/wallboard main body layer with some voids between the bar-shaped cork wood pieces to form the bar rectangular shaped holes on the buffer layer. Alternatively, the hole structures are formed on the buffer layer formed by foamed PVC through punching, etching, molding, casting or any other manner.

During use, after the backing surface on the floor or the wall is cleaned, glue is applied to the buffer layer. The amount of glue applied is sufficient to enter the holes such that when the adhesive floor/wallboard is pressed into place onto the backing surface, the glue enters the holes and contacts the main body of the adhesive floor/wallboard. Then, pressure is applied to the floor/wallboard to cause the glue to enter the holes, and the installation work is completed after the glue is cured.

Embodiment 3

Figure 4:
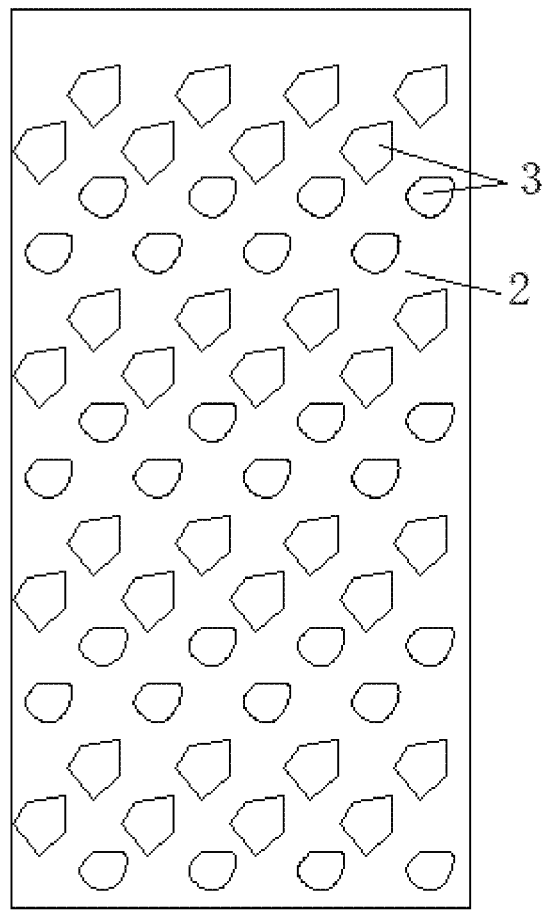
FIG. 4 is a schematic structural diagram of a back surface of an adhesive floor/wallboard according to Embodiment 3.

As shown in FIG. 4, the adhesive floor/wallboard structurally includes a floor/wallboard main body layer 1 and further includes a buffer layer 2 adhered to the back surface of the floor/wallboard main body layer. The buffer layer is provided with a plurality of holes 3. The holes have a depth that extends through the buffer layer so the holes communicates with the main body layer. The thickness of the floor/wallboard main body layer is 5 mm, the thickness of the buffer layer is 3 mm, the holes are irregular holes, the area of the holes is 25% of the area of the buffer layer, and the material of the buffer layer is foamed EVA. The material of the floor/wallboard main body layer is a medium density fiberboard.

During use, after the backing surface on the floor or the wall is cleaned, glue is applied to the buffer layer. The amount of glue applied is sufficient to enter the holes such that when the adhesive floor/wallboard is pressed into place onto the backing surface, the glue enters the holes and contacts the main body of the adhesive floor/wallboard. Then, pressure is applied to the floor/wallboard to cause the glue to enter the holes, and the installation work is completed after the glue is cured.

Embodiment 4

The adhesive floor/wallboard structurally includes a floor/wallboard main body layer 1 and further includes a buffer layer 2 adhered to the back surface of the floor/wallboard main body layer. The buffer layer is provided with a plurality of holes 3. The holes have a depth that extends through the buffer layer so the holes communicates with the main body layer. The thickness of the floor/wallboard main body layer is 3 mm, the thickness of the buffer layer is 5 mm, the holes are elliptical holes, the area of the holes is 40% of the area of the buffer layer, and the material of the buffer layer is IXPE. The material of the floor/wallboard main body layer is a high density fiberboard.

During use, after the backing surface on the floor or the wall is cleaned, glue is applied to the buffer layer. The amount of glue applied is sufficient to enter the holes such that when the adhesive floor/wallboard is pressed into place onto the backing surface, the glue enters the holes and contacts the main body of the adhesive floor/wallboard. Then, pressure is applied to the floor/wallboard to cause the glue to enter the holes, and the installation work is completed after the glue is cured.

Embodiment 5

Figure 5:
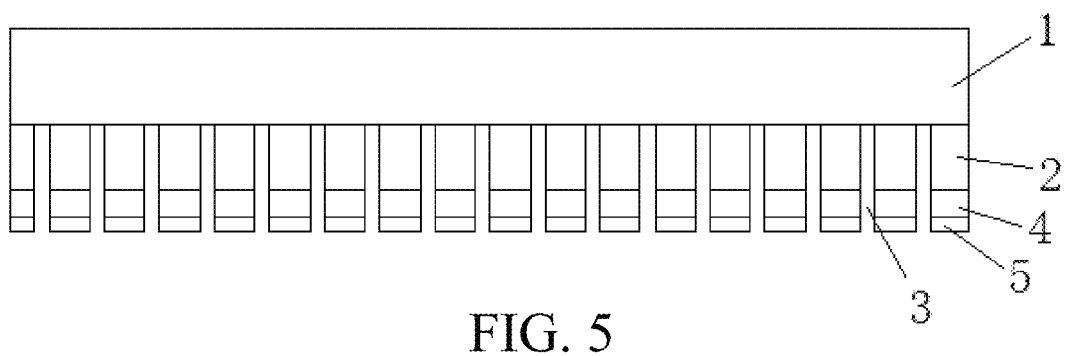
FIG. 5 is a cross-sectional view of an adhesive floor/wallboard according to Embodiment 5.

As shown in FIG. 5, the adhesive floor/wallboard structurally includes a floor/wallboard main body layer 1 and further includes a buffer layer 2 adhered to the back surface of the floor/wallboard main body layer. The buffer layer is provided with a plurality of holes 3. The holes have a depth that extends through the buffer layer so the holes communicate with the main body layer. The adhesive floor/wallboard further includes a self-adhesive layer 4 and a release layer 5, the self-adhesive layer is adhered to the back surface of the buffer layer, the release layer is adhered to the back surface of the self-adhesive layer, and the adhesive layer and the release layer are also provided with holes in the positions corresponding to the holes of the buffer layer. The thickness of the floor/wallboard main body layer is 5 mm, the thickness of the buffer layer is 4 mm, the holes are round holes, the area of the holes is 45% of the area of the buffer layer, and the material of the buffer layer is cork wood. The material of the floor/wallboard main body layer is a glass magnesium board.

During use, after the backing surface on the floor or wall is cleaned, glue is applied over the release layer and into the holes. The amount of glue applied is sufficient to enter the holes such that when the adhesive floor/wallboard is pressed into place onto the backing surface, the glue enters the holes and contacts the main body of the adhesive floor/wallboard. Then, the release layer of the adhesive floor/wallboard is removed. The adhesive floor/wallboard is pressed into place onto a backing surface. The self-adhesive holds the adhesive floor/wallboard in place. Pressure is applied to the floor/wallboard causing the glue to enter the holes, and the installation work is completed after the glue is cured. The self-adhesive layer is used for fixing the position in advance before the glue is cured, so as to prevent the floor/wallboard from being displaced or peeled off the backing surface.

Embodiment 6

The adhesive floor/wallboard structurally includes a floor/wallboard main body layer and further includes a buffer layer adhered to the back surface of the floor/wallboard main body layer. The buffer layer is provided with a plurality of holes. The adhesive floor/wallboard further includes a self-adhesive layer and a release layer, the self-adhesive layer is adhered to the back surface of the buffer layer, the release layer is adhered to the back surface of the self-adhesive layer, and the adhesive layer and the release layer are also provided with holes in the positions corresponding to the holes of the buffer layer. The thickness of the floor/wallboard main body layer is 0.5 mm, the thickness of the buffer layer is 3 mm, the holes are square holes, the area of the holes is 50% of the area of the buffer layer, and the material of the buffer layer is foamed EVA. The material of the floor/wallboard main body layer is a high density PVC composite material.

During use, after the backing surface on the floor or wall is cleaned, glue is applied over the release layer and into the holes. The amount of glue applied is sufficient to enter the holes such that when the adhesive floor/wallboard is pressed into place onto the backing surface, the glue enters the holes and contacts the main body of the adhesive floor/wallboard. Then, the release layer of the adhesive floor/wallboard is removed. The adhesive floor/wallboard is pressed into place onto a backing surface. The self-adhesive holds the adhesive floor/wallboard in place. Pressure applied to the floor/wallboard causes the glue to enter the holes, and the installation work is completed after the glue is cured. The self-adhesive layer is used for fixing the position in advance before the glue is cured, so as to prevent the floor/wallboard from being displaced or peeled off the backing surface.

Embodiment 7

The adhesive floor/wallboard structurally includes a floor/wallboard main body layer and further includes a buffer layer adhered to the back surface of the floor/wallboard main body layer. The buffer layer is provided with a plurality of holes. The adhesive floor/wallboard further includes a self-adhesive layer and a release layer, the self-adhesive layer is adhered to the back surface of the buffer layer, the release layer is adhered to the back surface of the self-adhesive layer, and the adhesive layer and the release layer are also provided with holes in the positions corresponding to the holes of the buffer layer. The thickness of the floor/wallboard main body layer is 2.5 mm, the thickness of the buffer layer is 0.5 mm, the holes are round holes, the area of the holes is 60% of the area of the buffer layer, and the material of the buffer layer is IXPE. The material of the floor/wallboard main body layer is a bamboo board.

During use, after the backing surface on the floor or wall is cleaned, glue is applied over the release layer and into the holes. The amount of glue applied is sufficient to enter the holes such that when the adhesive floor/wallboard is pressed into place onto the backing surface, the glue enters the holes and contacts the main body of the adhesive floor/wallboard. Then, the release layer of the adhesive floor/wallboard is removed. The adhesive floor/wallboard is pressed into place onto a backing surface. The self-adhesive holds the adhesive floor/wallboard in place. Pressure is applied to the floor/wallboard and causes the glue to enter the holes, and the installation work is completed after the glue is cured. The self-adhesive layer is used for fixing the position in advance before the glue is cured, so as to prevent the floor/wallboard from being displaced or peeled off the backing surface.

Embodiment 8

The adhesive floor/wallboard structurally includes a floor/wallboard main body layer and further includes a buffer layer adhered to the back surface of the floor/wallboard main body layer. The buffer layer is provided with a plurality of holes. The adhesive floor/wallboard further includes a self-adhesive layer and a release layer, the self-adhesive layer is adhered to the back surface of the buffer layer, the release layer is adhered to the back surface of the self-adhesive layer, and the adhesive layer and the release layer are also provided with holes in the positions corresponding to the holes of the buffer layer. The thickness of the floor/wallboard main body layer is 4 mm, the thickness of the buffer layer is 2 mm, the holes are rectangular holes, the area of the holes is 75% of the area of the buffer layer, and the material of the buffer layer is foamed PVC. The material of the floor/wallboard main body layer is a wood board.

During use, after the backing surface on the floor or wall is cleaned, glue is applied over the release layer and into the holes. The amount of glue applied is sufficient to enter the holes such that when the adhesive floor/wallboard is pressed into place onto the backing surface, the glue enters the holes and contacts the main body of the adhesive floor/wallboard. Then, the release layer of the adhesive floor/wallboard is removed. The adhesive floor/wallboard is pressed into place onto a backing surface. The self-adhesive holds the adhesive floor/wallboard in place. Pressure is applied to the floor/wallboard causes the glue to enter the holes, and the installation work is completed after the glue is cured. The self-adhesive layer is used for fixing the position in advance before the glue is cured, so as to prevent the floor/wallboard from being displaced or peeled off the backing surface.

Embodiment 9

The present embodiment is basically the same as Embodiment 8, and the difference is that the material of the floor/wallboard main body layer is an aluminum-plastic board.

Embodiment 10

The present embodiment is basically the same as Embodiment 8, and the difference is that the material of the floor/wallboard main body layer is textile.

Embodiment 11

The present embodiment is basically the same as Embodiment 8, and the difference is that the material of the floor/wallboard main body layer is a paperboard.

Embodiment 12

The present embodiment is basically the same as Embodiment 8, and the difference is that the material of the floor/wallboard main body layer is an HPL fireproof board.

The above embodiments are preferred implementations of the disclosure, but the implementations of the disclosure are not limited by the above embodiments, and any changes, modifications, substitutions, combinations and simplifications made without departing from the spirit and principles of the disclosure should be equivalent replacements and are all included in the protection scope of the disclosure.

In the description of the disclosure, it is to be understood that the terms indicating the orientation or the positional relationship are based on the orientation or positional relationship shown in the drawings, are merely for the convenience of describing the disclosure and simplifying the description rather than indicating or implying that the structure indicated must have a specific orientation and be constructed in a specific orientation, and thus are not to be construed as limiting the disclosure.

In the description of the disclosure, it should be noted that the orientation or positional relationship indicated by the terms "center", "upper", "lower", "left", "right", "vertical", "horizontal", "inside" and "outside" are based on the orientation or positional relationship shown in the drawings, or the orientation or positional relationship that the product according to the disclosure is conventionally placed when in use, are merely for the convenience of describing the disclosure and simplifying the description rather than indicating or implying that the device or element indicated must have a specific orientation and be constructed and operated in a specific orientation, and thus are not to be construed as limiting the disclosure.

Moreover, the terms "horizontal", "vertical", "overhanging", and the like do not mean that the component is required to be absolutely horizontal or overhanging, but may be slightly inclined. For example, the "horizontal" simply means that the direction thereof is more horizontal than "vertical", and does not mean that the structure must be completely horizontal, but may be slightly inclined.

In the disclosure, unless explicitly stated and defined otherwise, the condition that the first feature is on or under the second feature may include that the first feature and the second feature are in direct contact, and may also include that the first feature and the second feature are not in direct contact and are in contact by additional features therebetween. Besides, the condition that the first feature is over, above and on the second feature includes that the first feature is directly above and obliquely above the second feature, or merely indicates that the level of the first feature is higher than the second feature. The condition that the first feature is under, below and underneath the second feature includes that the first feature is directly below and obliquely below the second feature, or merely indicates that the level of the first feature is lower than the second feature.

What is claimed is:

1. An adhesive floor/wallboard comprising a floor/wallboard main body layer, and a buffer layer adhered to the back surface of the floor/wallboard main body layer, wherein the buffer layer is provided with a plurality of holes, the holes extend through the buffer layer to the main body layer, wherein a portion of the back surface of the floor/wallboard main body layer is not covered by the buffer layer, and wherein the buffer layer comprises irradiation cross-linked polyethylene (IXPE).

2. The adhesive floor/wallboard according to claim 1, wherein the holes are at least one of round holes, elliptical holes, square holes and irregular holes, and the area of the holes is 25% to 75% of the area of the buffer layer.

3. The adhesive floor/wallboard according to claim 2, wherein if the holes are round holes, elliptical holes, or square holes, the area of the holes is 35% to 75% of the area of the buffer layer.

4. The adhesive floor/wallboard according to claim 2, wherein if the holes are irregular holes that are not round holes, elliptical holes, or square holes, the area of the holes is 25% of the area of the buffer layer.

5. The adhesive floor/wallboard according to claim 1, wherein the buffer layer further comprises foamed polyvinyl chloride (PVC) or foamed ethylene vinyl acetate (EVA) or cork wood.

6. The adhesive floor/wallboard according to claim 5, further comprising a self-adhesive layer and a release paper layer, wherein the self-adhesive layer is adhered to the back surface of the buffer layer, the release paper layer is adhered to the back surface of the self-adhesive layer, and the self-adhesive layer and the release paper layer are also provided with holes in the positions corresponding to the holes of the buffer layer.

7. The adhesive floor/wallboard according to claim 6, wherein the thickness of the floor/wallboard main body layer is between 0.5 mm and 5 mm, and the thickness of the buffer layer is between 0.5 mm and 5 mm.

8. The adhesive floor/wallboard according to claim 6, wherein the material of the floor/wallboard main body layer is at least one of wood board, a bamboo board, a high density PVC composite material, a glass magnesium plate, a high density fiberboard, a medium density fiberboard, an aluminum alloy material, a cement board, an aluminum-plastic board, textile, a paperboard, or an HPL fireproof board.

9. The adhesive floor/wallboard according to claim 1, further comprising a self-adhesive layer and a release paper layer, wherein the self-adhesive layer is adhered to the back surface of the buffer layer, the release paper layer is adhered to the back surface of the self-adhesive layer, and the self-adhesive layer and the release paper layer are also provided with holes in the positions corresponding to the holes of the buffer layer.

10. The adhesive floor/wallboard according to claim 9 wherein the thickness of the floor/wallboard main body layer is 0.5-5 mm and the thickness of the buffer layer is between 0.5 mm and 5 mm.

11. The adhesive floor/wallboard according to claim 1, wherein the material of the floor/wallboard main body layer is at least one of wood board, a bamboo board, a high density PVC composite material, a glass magnesium plate, a high density fiberboard, a medium density fiberboard, an aluminum alloy material, a cement board, an aluminum-plastic board, textile, a paperboard, and an HPL fireproof board.

12. The adhesive floor/wallboard according to claim 11, wherein the thickness of the floor/wallboard main body layer is 0.5-5 mm and the thickness of the buffer layer is between 0.5 mm and 5 mm.

13. An adhesive floor/wallboard comprising a floor/wallboard main body layer, a buffer layer adhered to the back surface of the floor/wallboard main body layer, a self-adhesive layer, and a release paper layer,
wherein the self-adhesive layer is adhered to the back surface of the buffer layer, and the release paper layer is adhered to the back surface of the self-adhesive layer,
wherein the buffer layer, the self-adhesive layer, and the release paper layer are provided with a plurality of holes, the plurality of holes extend through the buffer layer, the self-adhesive layer, and the release paper layer all the way to the main body layer, and a portion of the back surface of the floor/wallboard main body layer is not covered by the buffer layer, and
wherein the material of the buffer layer comprises irradiation cross-linked polyethylene (IXPE).

* * * * *